June 30, 1942. H. C. BAUMAN 2,288,430
SCANNING APPARATUS
Filed July 26, 1940 3 Sheets-Sheet 2
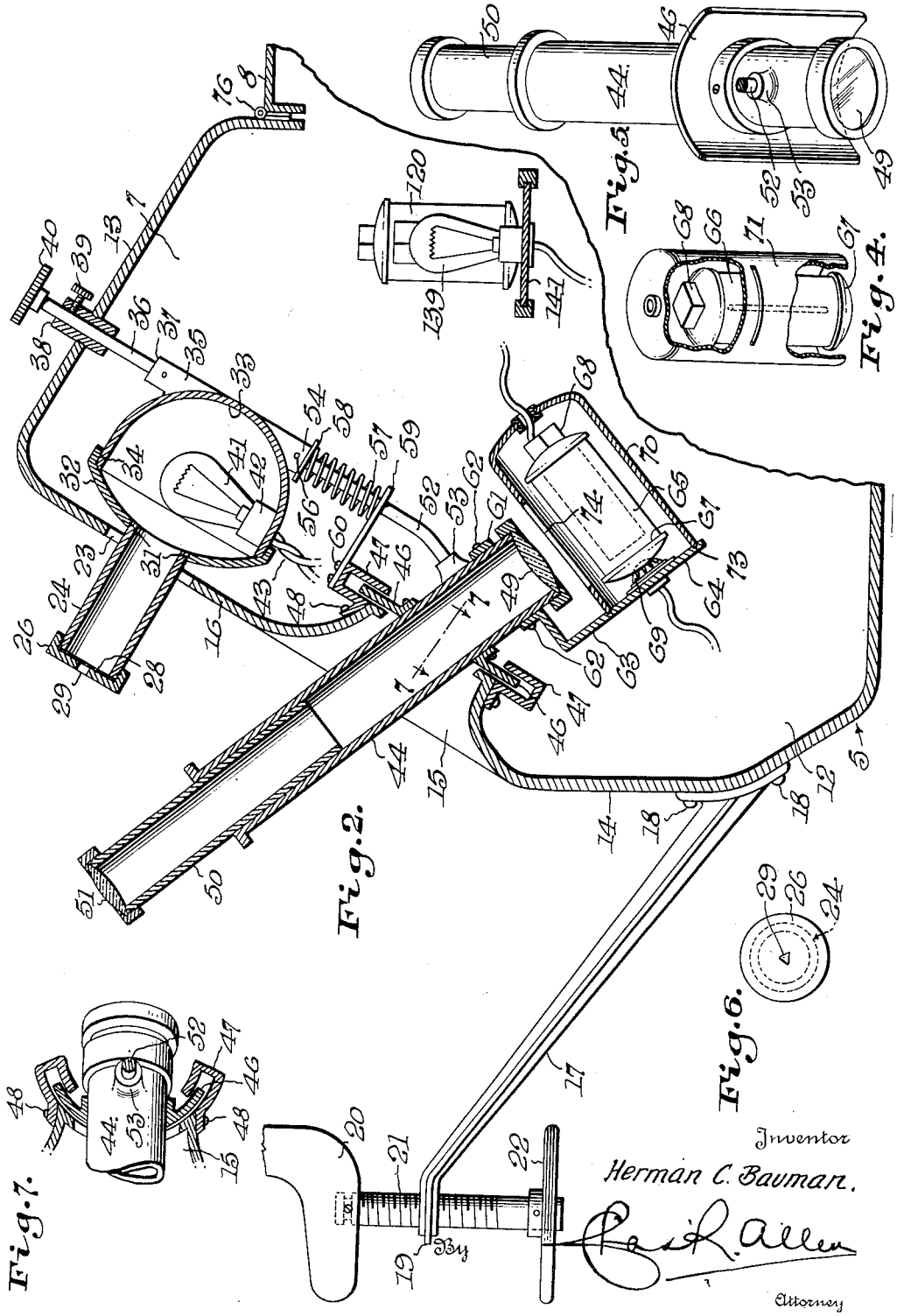
Inventor
Herman C. Bauman.
By
Attorney

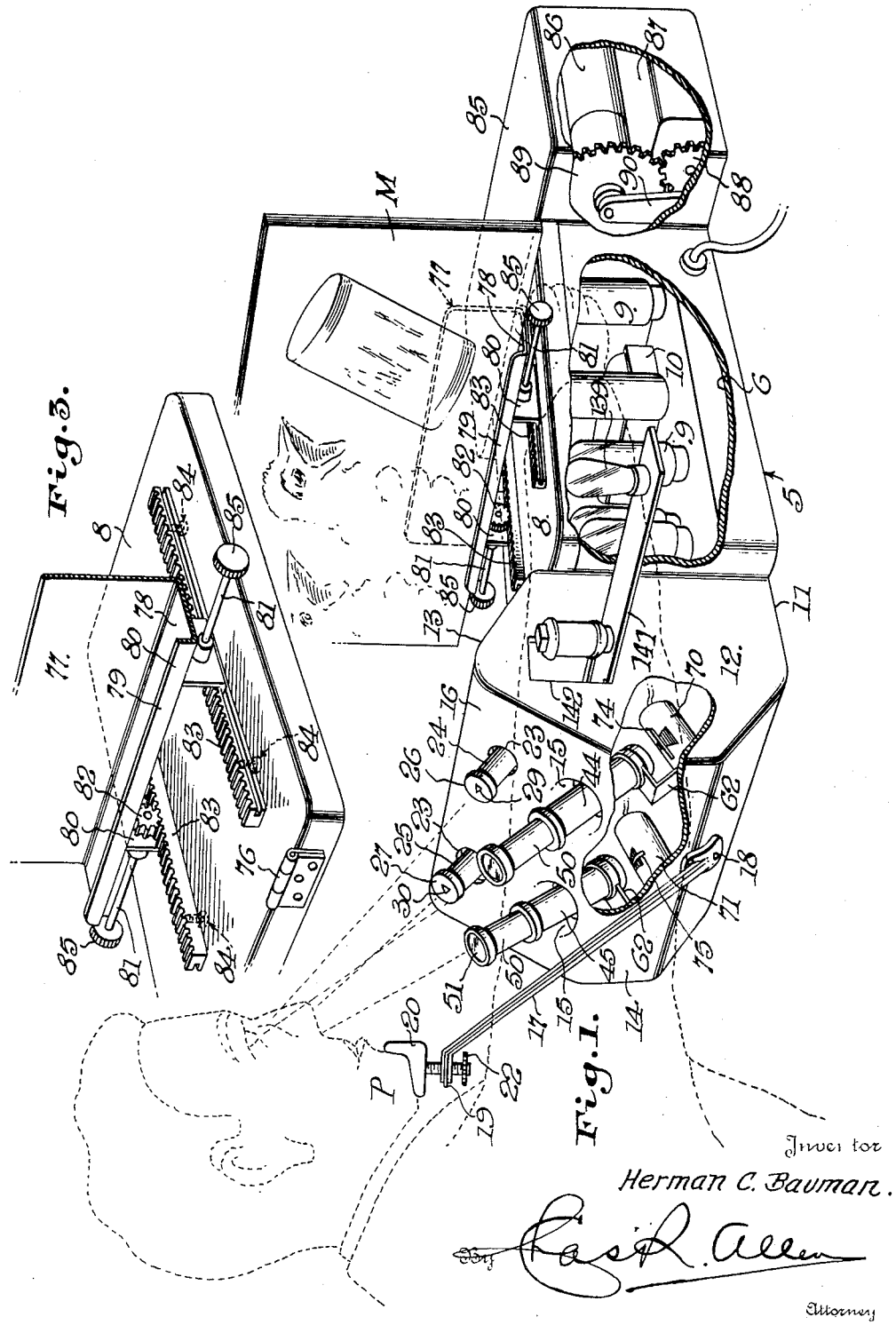

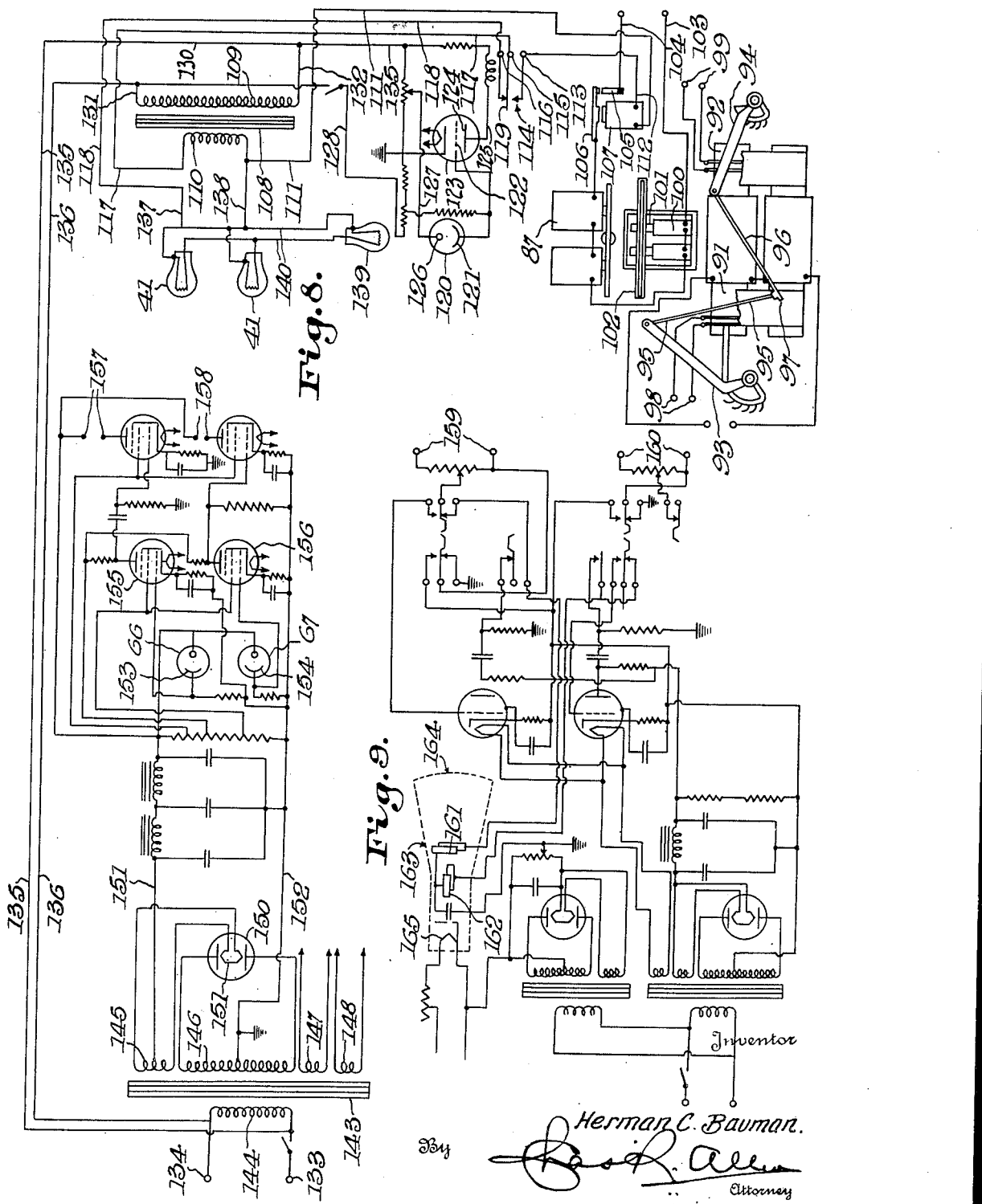

Patented June 30, 1942

2,288,430

UNITED STATES PATENT OFFICE 2,288,430

SCANNING APPARATUS

Herman Carl Bauman, Brooklyn, N. Y., assignor to J. Sterling Getchell, Inc., New York, N. Y., a corporation of New York Application July 26, 1940, Serial No. 347,742

14 Claims. (Cl. 88—20)

The invention relates generally to electronic eye movement scanners and recorders and has for an object to provide a novel and extremely simple instrument adapted for use in making tests of the eyes as they scan or peruse objects, scenes or written and printed matter.

In order to make certain tests of individuals for determining the reading time of literature, printed matter and the like, it has heretofore been proposed to record the movement of the eye in a vertical and horizontal plane by producing an image of such movements on a sensitized picture strip. This practice is objectionable in view of the high cost of said strips and the lengthy time required in examining the strip after its development.

In its more detailed nature therefore, the invention resides in the provision of a novel, extremely simple device having provision for recording eye movements and scanning by means of photo-electric cells which receive an image of the eye movements so that said image may be amplified in a suitable amplifying circuit whereby the amplified current produced by the photo-electric cells may be employed for operating a recorder including a movable stylus traveling over a record strip.

With these and other objects in view which will more fully appear, the nature of the invention will be more clearly understood by following the description, the appended claims, and the several views illustrated in the accompanying drawings.

In the drawings:

Figure 1 is a perspective view of an apparatus embodying the invention and illustrating the manner in which projected light is reflected on the corneas of the person's eyes being tested.

Figure 2 is a central vertical longitudinal section illustrating the position of the photo-electric cells for receiving the reflected image from the projected light source reflected by the eyes of the person being examined.

Figure 3 is a fragmentary perspective view illustrating the adjustable rest employed for supporting the material being scanned.

Figure 4 is a sectional perspective view of one of the photo-electric cell tube shields.

Figure 5 is a fragmentary perspective view of the lower end of the light projecting tube, the associated photo-electric cell being removed.

Figure 6 is a detail end view of the light ray projecting tube illustrating the triangular aperture formed in the closed end thereof.

Figure 7 is a fragmentary sectional view taken on the line 7—7 on Figure 2.

Figure 8 is a diagrammatic view illustrating the circuit for the photo-electric tubes showing the same coupled to suitable amplifiers and an energizing transformer, the connected circuit for the light source and a cut-out controlled by a photo-electric cell, and a recorder for receiving the amplified impulses upon energization of the photo-electric cells.

Figure 9 is a diagrammatic view of a cathode ray oscilloscope circuit which may be used in lieu of the recorder shown in Figure 8.

In the drawings in which like reference characters indicate like parts in all of the figures, 5 designates the casing of my improved eye testing and scanning device in which all of the parts pertaining thereto are housed.

The casing 5 is elongate and may be formed of metal stampings or other suitable material, and it includes side walls 6 and 7 and a top closure wall designated 8. A panel or bottom wall is provided for supporting the various electrical equipment embodied in the invention, such as amplifying tubes 9 and the usual additional amplifying equipment generally designated 10.

Formed on one end of the casing 5 is a scanning equipment housing extension designated 11 having side walls 12 and an oblique top wall 13 extending upwardly-forwardly from the top wall or casing cover 8. The front wall 14 of the scanning housing extension 11 is stepped as at 15, and said stepped portion is connected to the oblique top wall 13 by means of an upwardly-rearwardly slanting top wall portion 16.

Extending forwardly-upwardly from the front wall 14 of the scanning housing is a bracket 17 which is rigidly secured at its lower end to the housing as at 18, thereby to project its free end 19 into position for supporting a chin rest 20. The chin rest 20 is swivelled on the upper end of an adjusting screw 21 which is threaded through the bracket end 19 and has a knurled portion 22 to effect the raising and lowering of the chin rest so that the chin of a person indicated at P may rest thereon.

Mounted in a pair of suitable openings 23 formed in the slanting wall 16 of the scanning housing 11 are light projecting tubes 24 and 25 the outer ends of which are provided with screw cap shields 26 and 27 in back of each of which is located a light filter 28 for reducing the intensity of the light rays projected through the tubes 24 and 25. The screw cap 26 is provided with a triangular opening 29, the apex of which extends in a horizontal direction, and the screw cap closure 27 is provided with a triangular opening 30 having its apex extending in a vertical direction or at right angles with respect to the opening 29 in the cap 26. Secured as at 31 to the inner end of each light ray projecting tubes 24 and 25 is a disk-shaped member 32, and said disk-shaped member is secured to a parabolic reflector 33 by means of a screw-threaded connection indicated at 34.

The parabolic reflectors for the light ray projecting tubes are identical and each is provided with a projection 35 to which is attached a slide rod 36 by means of a securing boss indicated at 37. Each slide rod 36 operates in a guide 38 secured in the oblique top wall 13 of the scanning housing, and each said guide is provided with a locking screw 39 for engaging the respective slide rod when the same is raised or lowered or partially rotated by manipulation of a knurled thumb piece 40. Vertical sliding movement of a given rod 36 will cause the associated reflector 33 to be raised or lowered so that reflected light rays from a light source 41 such as an electric lamp mounted within the reflector in a suitable base 42 will be directed on the corneas of the eyes of a person taking the test. The electric lamp 41 may be connected to a source of current by means of a lead line 43, and it is to be understood that each light source 41 is connected to a control circuit which will be hereinafter more fully described.

Mounted in the stepped portion 15 of the scanning housing is a pair of light ray receiving tubes 44 and 45 the inner ends of which extend through openings in the stepped wall of the scanning housing and are attached to plates 46 each of which is a section of a cylinder concentric with the respective rod 36, said plates operating in suitable mounting guides 47 secured adjacent the opening in the stepped portion as indicated at 48. The guide plate 46 may slide within the mounting guide 47 so that the respective tube 44 may be adjusted simultaneously with the associated tube 25 in direct alignment with the reflected light rays from the corneas of the eyes of the person taking the test. A lens 49 is located in the lower end of each tube 44 which extends into the scanning housing while an adjustable telescopic tube 50 slidably mounted in each said tube 44 carries a lens 51 to magnify the light rays reflected into the tube 44.

A rod 52 has its lower end rigidly connected to each tube 44 as indicated at 53 while the upper end of said rod is similarly secured to a boss 54 depending from the respective reflector 33 as at 56. A coil spring 57 surrounds each rod 52 and has one end opposed by a washer 58 while its opposite end engages a stationary bracket 59 secured to the guide 47 by screws or the like indicated at 60.

A collar 61 surrounds the lower end of each tube 44 and is fastened thereto by means of screws 62. An angle bracket 63 extends from the band 61 and terminates in a supporting platform 64. Photo-electric cells 65 and 66 are supported on the two platforms 64, 64. Each photo-electric cell comprises a base portion 67 having a cathode connection 68 and an anode connection 69. Surrounding each photo-electric cell tube 65 or 66 is a metal shield 70 or 71 completely enclosing the photo-electric cell tube and secured in place by being received at its lower edge in an annular groove 73. The metal shield 70 is provided with a longitudinal slot 74 while the photo-electric tube shield 71 is provided with a circumferential slot 75 so that light rays projected through the triangular openings 29 and 30, when reflected through the tubes 44 and 45 will be reflected on the cathodes of the photo-electric cell tubes through the longitudinal and circumferential slots 74 and 75, thereby energizing the respective photo-electric cell tubes when the corneas of the eyes of a person taking the test move vertically and horizontally.

A rest for the material being scanned is provided on the cover wall 8 of the casing 5 and as shown in Figures 1 and 3. The cover wall 8 is hinged as at 76 to the casing 5 so that entry into the casing may be made for the purpose of repairs or replacement of parts. The rest is designated 77 and includes a main supporting back, a base portion indicated at 78, and a front flange 79 for engaging and holding the material being scanned. At each end of the rest there is provided a downwardly extending bracket 80 in which is journaled a shaft 81 on the inner end of which is secured a pinion 82. The pinions 82 mesh with a pair of parallel rack bars 83. The rack bars 83 may be secured to the cover 8 by screws indicated at 84. Rotation of the knurled knobs 85 rigidly secured to the shafts 81 will advance the rest 77 toward or from the person taking the test so that the material being scanned by said person may be readily adjusted with respect to his eyes.

The rear end of the casing 5 is provided with a transverse casing enlargement 85 in which is housed the recorder including a recording paper roll 86 which may be driven by means of a paper shifter motor 87 through the medium of suitable gearing 88 and 89. Brackets 90 are provided at each end of the paper roll 86 for supporting the roll and the gearing carried thereby. In the telautograph type recorder, the paper strip over which the stylus travels is wound from one roll onto another roll and it is to be understood that the recorder shown in Figure 8 includes such a mechanism. In addition, the recorder includes bucket-type coils 91 and 92 for operating the respective stylus operating arms 93 and 94 which connect with links 95 and 96 connected to the stylus 97. The bucket-type coils are provided with terminals 98 and 99 which are adapted to be connected to the output terminals of the respective photo tube circuits as shown in Figure 8. A stylus lifter is also employed in the recorder and includes a pair of solenoids 100 the armatures 101 of which are connected to the stylus lifter 102 to automatically interrupt contact of the stylus with the paper strip when the recorder is inoperative. The solenoids 100 and paper shifter motor 87 are supplied from a suitable source of current through feed lines 103 and 104, and interposed in the feed line 104 is a switch including a stationary contact 105 adapted to be engaged by a movable contact 106. The movable switch contact 106 is normally held open and is closed at the proper time by means of a relay 107 in circuit with a supply transformer 108 having a primary winding 109 and a secondary winding 110 as shown in Figure 8. A lead line 111 is connected with the relay 107 and the secondary 110 of the transformer 108. Lead line 112 connects with the terminal 113 of the relay 114 which is connected in series, through its terminals 115 and 116, and lead lines 117, 118 with the secondary of the transformer 108. Energization of the sensitive relay 115 will move an armature 119 to interrupt the circuit between the lines 117 and 118 and the transformer winding 110, thereby completing the circuit through the relay 107.

A photo-electric cell tube 120 has its cathode 121 connected to the grid 122 of an amplifier tube 123 while the plate 124 of said amplifying tube is connected by a lead 125 to the winding of the sensitive relay 115. The anode 126 of the photo-electric tube 120 is connected to a resistance network through a lead line 127. Lead lines 128 and 130 are connected to the winding 109 of the transformer 108 by means of lead lines 131 and 132 respectively.

The transformer 108 has its primary winding 109 supplied from a suitable source of current as indicated at 133 and 134 such as an alternating 110 volt domestic source and said current is supplied to the primary winding 109 by feed lines 135 and 136 respectively.

Also located in the secondary winding 110 of the transformer 108 are the light source bulbs 41 which project light rays through the tubes 24 and 25. Lead lines 137 and 138 connect with the bulbs 41 and said bulbs are shunted across the leads 137 and 138.

The cathode 121 of the photo-electric tube 120 is adapted to be energized by an electric lamp 139 which is connected to the secondary 110 by lead lines 140. As shown in Figure 1, the light source 139 is supported by a bracket 141 extending from the side wall 12 of the scanning housing and the photo-electric tube 120 is placed in close relation thereto. The bracket 141 may slide in and out of an opening 142 formed in the side wall 12 of the scanning housing 11. When the person P extends his right arm to turn the pages of the material being scanned indicated at M, or to adjust the rest 77, he interrupts the light beam projected from the lamp 139 onto the photo-electric tube 120 and interrupts the circuit through the recorder by causing the de-energization of the relay 115. Simultaneously, the circuit through the paper shifter or motor 87 is completed while at the same time the stylus lifter 102 is operated to move the stylus away from the paper.

Connected to the 110 volt current feed lines 133 and 134 is a transformer 143 having a primary winding 144 and secondary winding 145, 146, 147 and 148. The secondary winding 146 is connected to a tube 150 the filament 151 of which is fed from the secondary winding 145. Feed lines 151 and 152 are adapted to supply the cathodes and anodes of the photo-electric tubes 66 and 67 so that light reflected on the cathodes 153 and 154 of the photo-electric cell tubes will cause the energization thereof which may be amplified in the respective amplifier circuits 155 and 156. The output terminals 157 and 158 of the amplifier circuits are connected to the terminals 98 and 99 of the telautograph recorder whereby the bucket coils 91 and 92 will be energized to move the stylus 97 over the paper strip of the recorder in accordance with the movement of the eyes of a person taking the test.

The photo-electric tube circuits consist of suitable coupling devices for operating the amplifying circuits 155 and 156, the latter including the usual tubes, resistors, capacitors and inductors in conventional order well known in the art.

In the modification of the invention shown in Figure 9, the output terminals 157 and 158 of the amplifier circuits may connect with terminals 159 and 160 of a cathode ray oscilloscope which includes the usual circuit connected to the vertical and horizontal deflecting plates 161 and 162 of a cathode ray tube 163 having a fluorescent screen 164 while the opposite end of the tube is provided with the usual electron gun 165. When the cathode ray oscilloscope is employed in lieu of the recorder shown in Figure 8, a visual record of the eye movements may be made upon the fluorescent screen 164 of the cathode ray tube. The outputs of the photo tube circuits when placed across the terminals 159 and 160 corresponding to the vertical and horizontal component output of eye movement may produce on the fluorescent screen a record exactly as the eye movements occur.

The use of the cathode ray oscilloscope in various arts is well known and the circuit connections between the input terminals 159 and 160 connecting the vertical and horizontal deflecting plates 161 and 162 is well known and need not be enlarged upon.

The scanning test

To produce an accurate and permanent record of the scanning movements of a person's eyes while reading written or printed matter to determine the speed of such reading and the length of time the eyes fixate during the scanning movement, the person is placed in a chair in front of the scanning recorder so that his chin will rest upon the support 20. The current may then be turned on through the supply lines 133 and 134 to cause light rays to be projected through the tubes 24 and 25 and their respective triangular openings 29 and 30. The tubes 24 and 25 are manipulated so that the light rays will be directed onto the corneas of the person's eyes. When the person moves his eyes horizontally, or across the subject, light will be projected through the tube 44 onto the photo-electric cell tube 66 through the vertical slot 74 in the shield 70. By reason of the fact that more light is projected over a larger area onto the cathode of the photo cell 66, the amplifying circuit 155 will be energized thereby producing a greater current voltage at the output 157.

When the person moves his eyes vertically or up or down the subject, the reflected light rays from the triangular opening 30 are projected through the tube 45 onto the photo-electric tube 67 through the circumferential slot 75 in the screen 71. Such vertical eye movement causes the reflected light source to project an increased or decreased amount of light on the cathode 154 of the photo-electric tube 67 thereby increasing or decreasing the current output at the terminals 158.

Telautograph recorder

When the scanning test is made with a telautograph recorder, the terminals of the amplifier outputs 157 and 158 are connected to the respective terminals 98 and 99 of the bucket coils 91 and 92. During such tests, an increase or decrease of current from the outputs 157 and 158 will move the corresponding arms 93 and 94 of the recorder to produce on the recorder record strip, markings corresponding to the movement of the eyes duing scanning movement.

It is of course to be understood that the details of construction and arrangement of parts may be variously changed and modified without departing from the spirit and scope of my invention.

I claim:

1. A device for recording the binocular movements of an individual's eyes, comprising a casing, a source of light located in the casing for projecting rays of light on the corneas of the individual's eyes, photo-electric cells mounted in the casing adapted to receive reflections from the projected light source, a vertically apertured mask positioned in front of one of said cells adapted to vary the intensity of horizontally moving light rays imposed thereon, a horizontally apertured mask positioned in front of the other cell adapted to vary the intensity of vertically moving light rays on said cell, and a recorder energized by the intensity of light imposed on the photo-electric cells for producing a single record of the movement of both eyes.

2. A device for recording the binocular movements of an individual's eyes, comprising a casing, a support for the individual adjacent the casing and serving to fix the relation of the individual's eyes relative to said casing, a rest for supporting material being scanned directly in front of the individual, means for projecting light on the corneas of the individual's eyes, photo-electric cell tubes mounted in the casing for receiving the reflected image of the projected light, a mask positioned in front of each photo-electric cell, one of which is provided with a vertically extending aperture and the other mask having an aperture extending at right angles thereto, whereby the photo-electric cells will be alternately energized when the apertures are traversed by the vertically and horizontally moving light rays, and a recorder connected to the photo-electric cell tubes responsive to the intensity of light imposed on the tubes for producing a record of the movement of the individual's eyes.

3. A device for recording the binocular movements of a person's eyes, comprising a casing, means for holding the person's head in a fixed position with respect to the casing, means in the casing for projecting light rays on the corneas of the person's eyes, photo-electric cell tubes mounted in the casing for receiving reflections of the projected light, an apertured mask positioned in front of each of said tubes, the aperture of one of said masks extending at right angles to the other aperture, whereby the light intensity imposed on said tubes will be alternately varied when traversed by vertically and horizontally moving light beams, and a recorder operable by the energization of the photo-electric cell tubes in accordance with the intensity of the light imposed on the tubes.

4. A device for recording the binocular movements of a person's eyes, comprising a casing, means carried by the casing for supporting the person's head in a fixed position, a rest mounted on the casing for receiving material to be scanned, a light source mounted in the casing for projecting geometrically shaped light beams on the corneas of the person's eyes, photo-electric tubes mounted in the casing, screens positioned over the tubes to intercept the reflected light beams, one of said tubes having a vertical slot and the other tube having a transverse slot, and means for recording the intensity of the light reflected on the photo-electric tubes traversed over the vertical and transverse slots.

5. A device for recording the binocular movements of a person's eyes, comprising a casing, an adjustable rest mounted on the casing for supporting material to be scanned, a bracket secured to the casing for supporting the person's head directly in front of the material being scanned, means including triangular openings in the casing for projecting light through said triangular openings onto the corneas of the person's eyes while scanning the material supported by the rest, photo-electric cell tubes mounted in the casing having apertured screens for receiving reflections of light from the person's eyes, one of said screens having its aperture extending at right angles to the other, whereby the triangular shaped beam of light traversing each aperture will vary the light intensity imposed on the tubes alternately during vertical and horizontal light beam movements, and a recorder operable upon energization of one of the photo-electric tubes.

6. A device for recording the binocular movements of a person's eyes, comprising a casing, a bracket supported by the casing for holding the person's head in a fixed position, an adjustable rest mounted on the casing for holding material to be scanned by the person, means in the casing for projecting a triangular light beam onto the cornea of each eye of said person, one of said triangular beams having its apex extending in a vertical direction and the other triangular beam having its apex extending in a transverse direction, photo-electric cell tubes mounted in the casing for receiving the triangular reflected light beams from the corneas of the person's eyes, screens placed over the photo-electric tubes, one of said screens having an elongate aperture extending at right angles to an aperture in the other screen, whereby said opertures will extend in vertical and transverse directions so that vertical movement of the person's eyes will increase or decrease the amount of light reflected on one of the photo-electric tubes while transverse movement of the person's eyes will increase or decrease the reflected light on the other photo-electric tube, and means for recording the increase and decrease of the reflected light beams.

7. A device for recording the binocular movement of a person's eyes, comprising a casing, a rest adjustably mounted on the casing for receiving material to be scanned, a bracket secured to one end of the casing for supporting the person's head in a fixed position, means for adjusting the bracket to cause the person's eyes to align with the scanning material, a pair of light projecting tubes mounted in the casing, a light source mounted in back of each tube whereby a geometrically shaped light beam will be projected onto each eye of the person, a pair of photo-electric cell tubes mounted in the casing for receiving light reflected by the person's eyes, an apertured mask for each tube, said masks having their apertures extending at right angles to each other whereby one of said tubes will be responsive to vertical eye movements while the other tube will be responsive to transverse eye movements, and means for recording the eye movements by the energization of the respective photo-electric tubes.

8. A device for recording the scanning movements of an individual's eyes, comprising a casing, a bracket supported by the casing for holding the individual's head in a fixed position, an adjustable rest mounted on the casing directly in front of the individual's eyes for holding material to be scanned, a pair of light projecting tubes carried by the casing for projecting triangular light beams onto the individual's eyes, photo-electric cell tubes mounted in the casing for receiving light beams reflected from the individual's eyes, an apertured mask mounted in front of each tube to intercept the reflected light rays, one of said apertures extending at right angles to the other to vary the intensity of light imposed on the tube when the masks are traversed by the triangular light beams whereby one of said tubes will be responsive to vertical eye movements and the other photo-electric cell tube will be responsive to transverse eye movements, and a recorder connected to the photo-electric cell tubes for producing a record of the vertical and transverse eye movements of the individual.

9. A device for recording the scanning movements of an individual's eyes, comprising a casing, a support for holding the individual's head in a fixed position, a rest directly in front of the individual's eyes for supporting material to be scanned, a pair of light projecting tubes located in the casing, a light source for each tube, photo-electric cell tubes mounted in the casing for receiving from the eyes of the individual reflections of the projected light sources, an apertured mask for each tube, the aperture of one of said masks extending at right angles to the other aperture whereby the light intensity will be varied alternately on each tube upon vertical and horizontal shifting movement of a traversing light ray, one of said photo-electric tubes being responsive to vertical eye movements, the other photo-electric tube being responsive to transverse eye movements, means operable upon the energization of the photo-electric cell tubes for producing a record of the eye movements, and means operable by the individual's arm movements while changing the scanning material for interrupting the operation of the light source and recording means.

10. A device for recording the binocular movements of a person's eyes, comprising a casing, a bracket carried by the casing for supporting the person's head in a fixed position, an adjustable rest mounted directly in front of the person's eyes for receiving material to be scanned, a pair of light sources located in the casing for projecting triangular beams of light on the corneas of the person's eyes, photo-electric cell tubes mounted in the casing, an apertured mask positioned in front of each photo-electric cell, the aperture of one of said masks extending at right angles to the other whereby the light intensity will be varied alternately when the projected light rays are shifted vertically and horizontally whereby one of said tubes will be responsive to vertical eye movements and the other responsive to transverse eye movements, means for amplifying the current produced in the photo-electric cell tubes when energized, and a cathode ray oscilloscope connected to the output amplified current of each photo-electric cell tube whereby an image on the oscilloscope given of the vertical and transverse eye movements of the person.

11. A device for recording the binocular movement of the eyes comprising a light source for projecting an angular light beam on the cornea of each eye, said beams being positioned so that no two sides are parallel, photo-electric cells for receiving the angular beams emanating from the virtual focal point of the eye, screens placed in front of each photo-electric cell for limiting the passage of the angular beams, one of said screens having a vertical aperture and the other screen having an aperture extending at right angles thereto whereby the light intensity imposed on each tube will be alternately varied upon shifting of the beams vertically and horizontally, and means responsive to the intensity of light imposed on the photo-electric cells for recording the movement of the eyes.

12. A device for recording the binocular movement of the eyes comprising a light source for projecting a geometrically shaped beam of light on the cornea of each eye, said beam being angular in formation, a photo-electric cell for receiving a virtual image of the incident beam projected on each cornea, an apertured mask located in front of each photo-electric cell, the aperture of one of said masks extending at right angles to the other whereby the intensity of light imposed on each tube will vary alternately upon vertical and horizontal shifting of the incident beams, and a recorder connected to the photo-electric cells responsive to the intensity of light imposed on the cells as a result of the movement of the virtual reflected beam in a vertical and horizontal direction.

13. A device for recording the binocular movement of the eyes comprising a light source for projecting a geometrically shaped incident ray on the cornea of each eye, said rays having no two of their sides parallel, a photo-electric cell for receiving a virtual image of each ray, an apertured mask located in front of each photo-electric cell, the aperture of one mask extending at right angles to the other mask whereby movement of the virtual ray will increase and decrease the intensity of light imposed on the photo-electric cell, and a recorder associated with the photo-electric cells for recording the movement of the virtual image upon movement of the eyes.

14. A device for recording the binocular movement of the eyes comprising a light source for projecting an angular incident ray on each eye cornea, a photo-electric cell for receiving the virtual image from each cornea, apertured screens to intercept the virtual image mounted in front of each photo-electric cell, the aperture of one of said screens extending at right angles to the other whereby movement of the eyes will increase or decrease the intensity of light imposed on the photo-electric cells, one of said cells being responsive to vertical movement of virtual reflections and the other cell being responsive to horizontal movement of virtual reflections, and a recorder connected to the photo-electric cells for indicating the amount of movement of each image.

HERMAN CARL BAUMAN.